E. R. MERRILL.
MINING MACHINE.
APPLICATION FILED JULY 1, 1910.

1,127,663.

Patented Feb. 9, 1915.
5 SHEETS—SHEET 2.

Witnesses
B. G. Brown
R. S. Gehr

Inventor
Edwin R. Merrill
By H. H. Bliss
Attorney

E. R. MERRILL.
MINING MACHINE.
APPLICATION FILED JULY 1, 1910.

1,127,663.

Patented Feb. 9, 1915.
5 SHEETS—SHEET 3.

Witnesses
V. G. Bram
R. S. Gehr

Inventor
Edwin R. Merrill
By H. O. F. Bliss
Attorney

E. R. MERRILL.
MINING MACHINE.
APPLICATION FILED JULY 1, 1910.

1,127,663.

Patented Feb. 9, 1915.
5 SHEETS—SHEET 4.

Witnesses

Inventor
Edwin R. Merrill
By H. H. Bliss
Attorney

E. R. MERRILL.
MINING MACHINE.
APPLICATION FILED JULY 1, 1910.

1,127,663.

Patented Feb. 9, 1915.
5 SHEETS—SHEET 5.

Witnesses
B. F. Brann
R. S. Gehr

Inventor
Edwin R. Merrill
By H. A. Blair
Attorney

UNITED STATES PATENT OFFICE.

EDWIN R. MERRILL, OF COLUMBUS, OHIO, ASSIGNOR TO THE JEFFREY MANUFACTURING COMPANY, A CORPORATION OF OHIO.

MINING-MACHINE.

1,127,663. Specification of Letters Patent. Patented Feb. 9, 1915.

Application filed July 1, 1910. Serial No. 569,996.

*To all whom it may concern:*

Be it known that I, EDWIN R. MERRILL, a citizen of the United States, residing at Columbus, in the county of Franklin and State of Ohio, have invented certain new and useful Improvements in Mining-Machines, of which the following is a specification, reference being had therein to the accompanying drawing.

This invention relates more especially to mining machines of the side cutting type.

The objects of the invention are the provision of improved means for effecting the entering or sumping cut of the machine, as where the machine is employed in mining on the room and pillar plan.

A further object is the provision of an improved form of gearing between the motor or engine and the driven parts.

A further object is the provision of improved clutch devices for controlling the operation of the driven parts.

These and such other objects as shall hereinafter appear are attained in the preferred form of construction shown in the accompanying drawings.

Fig. 6 is a detail vertical sectional view of the clutch which connects the driving gearing to the rear sprocket wheel of the cutting chain, and of the devices for actuating said clutch. Fig. 6ª is a face view of said clutch actuating devices.

The machine comprises a bed frame, a cutter frame projecting from the inner end thereof, propelling and guiding devices mounted on the bed frame, a motor mounted on the bed frame, and suitable driving connections between the motor and the propelling devices, and the cutters, respectively.

Figures 1, 2, 3, 4:
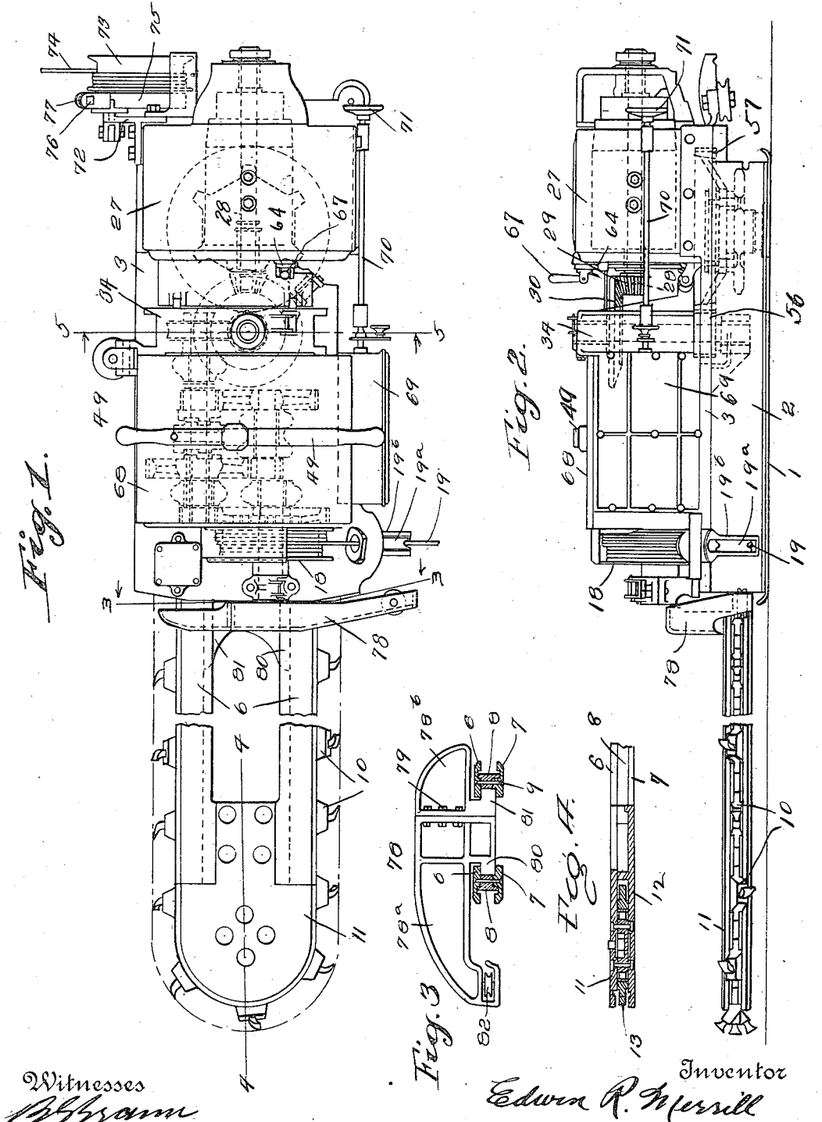
Figure 1 is a plan view of the machine, a part of the cutter being broken away.
Fig. 2 is a left side elevation of the same.
Fig. 3 is a transverse section on the line 3—3 of Fig. 1.
Fig. 4 is a vertical section on the line 4—4 of Fig. 1.

Referring to the construction in detail, the bed frame is composed of a bottom plate 1, flanged side plates 2, 2, and a top plate 3, all of which are connected to form a rigid structure. The top plate 3 is preferably in the form of a casting and is formed with front and rear depending brackets 4 and 5, respectively, upon which the cutter frame is mounted. The two parallel sides of the cutter frame are made up of top plates 6, bottom plates 7, and intermediate spacing bars 8 which are secured together as by rivets 9 (see Fig. 3). The space between the outer edges of plates 6 and 7 forms a guide for a cutter chain 10 which may be of any suitable construction. Ways are also formed between the inner edges of the plates 6 and 7, and these ways are adapted to receive flanged projections on the brackets 4 and 5 of the bed frame. The sides of the cutter frame are connected at their front end by suitable upper and lower plates 11 and 12 between which are mounted a sprocket wheel 13 over which the cutter chain passes. At the outer end of the cutter frame the cutter chain passes over a sprocket wheel 14 which is loosely mounted on an upright shaft 15. This shaft has its lower end mounted on the bottom plate 1 of the bed frame and is preferably connected to the bottom plate by means of a base casting 16 riveted to the said plate, the casting having an aperture in which the shaft is tightly fitted and further secured by a key 17. In case of need, additional support of any sort that may occur to the designer can be provided for the shaft.

The machine is designed to be propelled along the face of the coal during the cutting operation by a cable or the like, and upon the inner end of the bed frame is mounted a winding drum 18. A suitable draft cable 19 has one end secured to the winding drum so that it can be wound upon the drum when the latter is turned. The cable 19 passes downward from the drum and under a guide sheave or pulley 19$^a$ which is mounted in a block 19$^b$. This pulley block is in the nature of a caster frame having a hollow cylindrical stem or spindle rotatably mounted in the top plate of the bed frame. The arrangement is such that the cable 19 passes downward through said hollow spindle, and thence under the pulley. With the pulley mounted in this manner, it will be seen that the cable 19 can be taken off in any desired direction within a range of about 180°. The drum 18 is mounted upon a longitudinally disposed shaft 20 carried in bearings 21 and 22. The winding drum consists preferably of two parts, an outer flanged part 23 which is mounted to turn freely on the shaft 20, and an inner hub part 24 which is keyed fast on the shaft 20 and which has a split rim part 24$^a$ adapted to be expanded by means of conical wedges 25, said wedges being provided with nuts 26 by means of which they can be drawn endwise to expand the rim 24$^a$.

Figure 5:
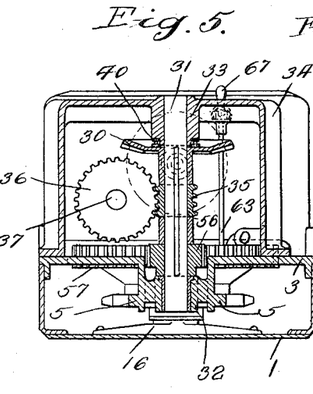
Fig. 5 is a vertical transverse section on the line 5—5 of Fig. 1.
Figures 6, 6A:
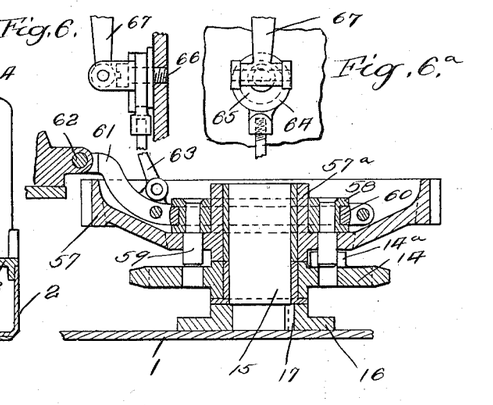
Figure 7:
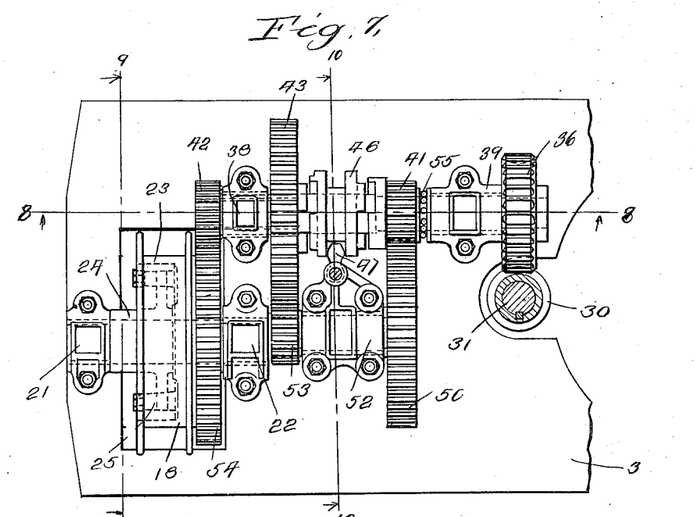
Fig. 7 is a plan view on a large scale of the inner part of the bed frame and of the gearing with gear casing removed.
Figure 8:
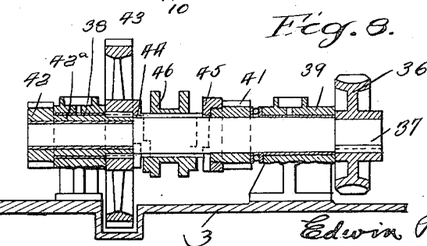
Fig. 8 is a vertical longitudinal section on the line 8—8 of Fig. 7.
Figure 9:
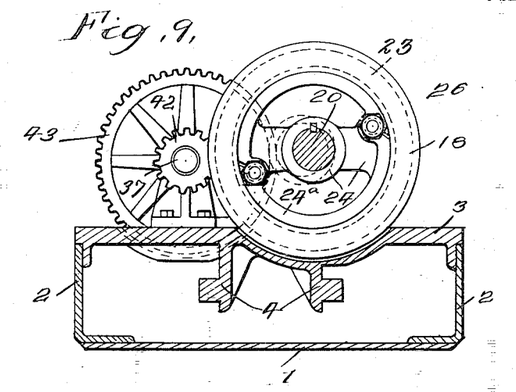
Fig. 9 is a vertical transverse section on the line 9—9 of Fig. 7.
Figure 10:
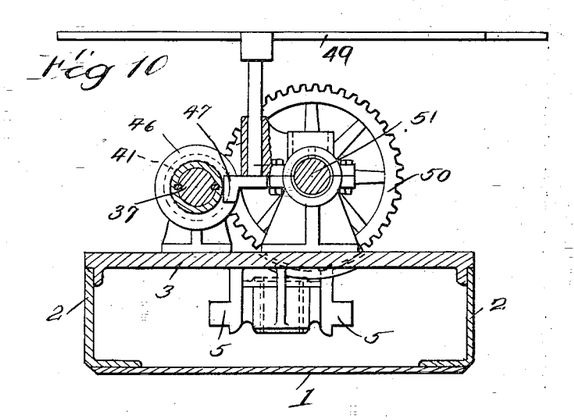
Fig. 10 is a vertical transverse section on the line 10—10 of Fig. 7.

27 is an electric motor which, as to details of construction, may be of any preferred form, and which is mounted upon the outer end of the bed frame with its armature shaft arranged longitudinally of the machine. This motor is designed to drive the winding drum 18 and the cutter chain 10, and to this end the following gearing is provided. The armature shaft 28 of the motor carries at its inner end a bevel pinion 29 which meshes with a bevel gear 30 on the vertical shaft 31. The lower end of this shaft is mounted in a bearing 32 formed in the depending bracket 5 of the bed frame (see Fig. 5). The upper end of the shaft turns in a bearing 33 carried by an upstanding frame or yoke 34 mounted on the bed frame.

35 is a worm which, like the beveled gear 30, is keyed to the shaft 31. This worm meshes with a worm wheel 36, which is mounted upon a longitudinally disposed shaft 37. This shaft is mounted in bearings 38, 39, carried by the top plate of the bed frame. A ball thrust bearing 40 is preferably interposed between the upper side of the bevel gear 30 and the bearing 33 to take the axial thrust of the worm.

A pinion 41 is mounted to turn loosely on shaft 37 adjacent the bearing 39, and upon the front end of the shaft 37 is mounted a spur pinion 42. The latter pinion has a sleeve-like hub extension 42$^a$ which extends through the bearing 38 and has a large spur gear 43 keyed to its rear end. The outer end of the hub of gear 43 is formed with a toothed clutch extension 44 and the pinion 41 also carries on its inner end a toothed clutch element 45. A grooved clutch collar 46 is slidably keyed upon shaft 37, and by means of it either the pinion 41 or the gear 43 and pinion 42 can, at will, be clutched to the shaft 37. The clutch collar 46 is shifted by means of a lever arm 47 which is secured to the lower end of a vertical shaft 48, said shaft carrying at its upper end a transversely disposed hand lever or bar 49. The lever 49 preferably extends to both sides of the machine so that it can readily be grasped by the operator when standing at either side of the machine.

The pinion 41 meshes with a gear wheel 50 which is mounted upon the outer end of a short shaft 51, this shaft being carried by a bearing 52 on the bed frame.

53 is a pinion secured to the inner end of the shaft 51 and meshes with the gear wheel 43. The pinion 42 meshes with a large gear 54 which is keyed to the shaft 20 upon which the winding drum 18 is mounted.

55 is a ball thrust bearing which is interposed between the pinion 41 and the bearing 39 to take any axial thrust that may result from the action of the worm and worm wheel.

It will be seen that by means of the gearing described, the winding drum 18 can be driven at either one of two speeds from the shaft 31, which itself is directly driven by the motor. Thus, if the clutch 46 is thrown so as to make the pinion 41 fast on the shaft 37, the rotation of said shaft will be transmitted through pinion 41 and gear 50 to the shaft 51, thence through pinion 53, gear 43, pinion 42 and gear 54 to the winding drum 18. On the other hand, if clutch 46 is thrown so as to connect gear 43 and with it pinion 42 to the shaft 37, the rotation of said shaft is then transmitted directly to pinion 42 and gear 54 through the winding drum 18, thus rotating the latter at considerably higher speed than before. With the clutch thrown as last described, it will be noted that pinion 53, gear 50 and pinion 41 turn idly.

The following devices are provided for driving the cutter chain. On the vertical shaft 31, and near its lower end is mounted a spur pinion 56 which meshes with a large spur gear 57 which is mounted to turn freely upon the upright shaft 15, said gear being disposed directly above the cutter chain sprocket wheel 14. On the upward extending hub 57ª of the gear is slidably mounted a collar 58 which carries a plurality of depending clutch pins 59 which extend through apertures in the web of the spur gear wheel 57. The upper face of sprocket wheel 14 is provided with a series of hollow semi-cylindrical bosses 14ª, there being one to correspond with each of the clutch pins 59, and when the collar 58 and said pins are in their lowermost position, the pins engage the bosses 14ª so that the rotation of gear wheel 57 is transmitted to sprocket wheel 14. The collar 58 is grooved to receive a band 60 to which is connected a lever arm 61 having its forward end pivotally connected at 62 to the rigid part of the bed frame structure. A link 63 is connected at its lower end to the lever arm 61, and at its upper end is connected to an eccentric band 64 which fits upon an eccentric 65. Said eccentric is mounted upon a screw stud 66 which projects from the front face of the frame of motor 27, and the eccentric is provided with a pivoted handle 67 by means of which it can be turned to actuate the link 63 and raise and lower the clutch collar 58. It will be noted that the handle 67 is very conveniently located to be grasped by the operator when he desires to throw the cutter chain into or out of operation.

The actuating gearing for the winding drum 18 and for the cutters which have been described, is highly advantageous, because it permits of the symmetrical arrangement of the motor in relation to the bed frame, and also because it permits a compact arrangement of all the necessary parts of the mechanism, it being desirable in a machine of this character that both the longitudinal and transverse dimensions of the bed frame shall be as small as possible. Furthermore, the gearing which drives the winding drum provides for a very wide range of speed by means of the use of a minimum number of elements capable of compact arrangement.

I prefer to inclose the inner train of gearing by a casing 68, for obvious reasons. On one side of this casing I mount a rheostat 69 for the motor and an operating shaft 70 extends from the rheostat to the outer end of the bed frame where it is provided with a hand wheel 71 which can be conveniently grasped by the operator when at the outer end of the machine.

During the operation of undercutting, when the machine is being drawn along the face of the coal by the cable 19, there is a tendency for the outer end of the machine to slue around in the direction in which the machine is moving, because ordinarily, the friction between the bed frame and floor of the mine is not sufficient to balance the reaction of the coal upon the cutter frame. The following means are provided for controlling the angular position of the machine relative to the face of the coal. On the outer rear corner of the bed frame is mounted a bracket 72 upon which is mounted a winding drum 73 for a cable 74, one end of the cable being made fast to the drum. This winding drum is free to turn upon its bearing support except for the resistance offered by an adjustable brake band 75, which engages a cylindrical flange or extension of the drum. A screw 76 is provided to draw the ends of the brake band together, and by turning the screw in one direction or the other by means of a handle 77 secured thereto, the braking force upon the drum may be varied at the will of the operator. Thus, it will be seen that by making the free end of cable 74 fast to an anchoring device, a resistance can be applied to the outer end of the machine for the purpose of balancing the reaction of the coal on the cutters, and this resistance can be varied as desired by means of the friction brake which controls the paying out of the cable 74 as the machine advances.

When the machine is brought into a mine room to undercut the coal, the first operation is the making of the entering or sumping cut. During this operation it is necessary to guide the machine as it is advanced longitudinally, and to this end, I provide the following devices. 78 is an arm preferably in the form of two cast sections 78ª and 78ᵇ which are secured together by bolts 79. The section 78ª has a depending outwardly turned flange 80, and the section 78ᵇ has a similar flange 81, these flanges being constructed to slidably fit the ways formed between the plates 6 and 7 of the cutter frame. The arm 78 is formed at its outer end with a hook or notch in which is mounted a pulley 82, which is arranged so that the feed cable 19 can be passed over it when said cable is extended inward in making the sumping cut.

Figure 11:
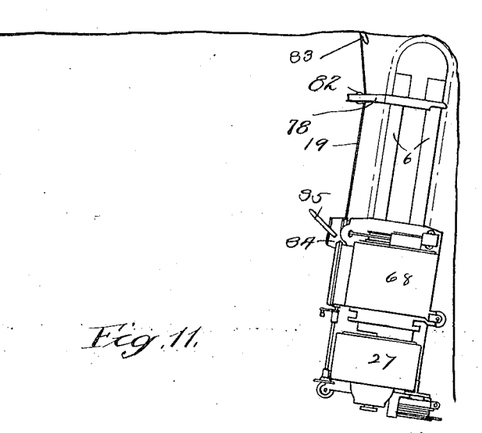
Fig. 11 is a diagrammatic view showing the machine at the beginning of the entering or sumping cut.

The operation of the machine will now be readily understood. The machine, on being brought into the mine room, is unloaded from the truck and brought to the face of the coal near the right rib, as shown in Fig. 11. The arm 78 having been moved forward as far as it will go in the cutter frame, the cable 19 is taken inward, passed over the pulley 82 and made fast to an anchor or jack 83 at the face of the coal. A guide plate 84 having an upstanding flange 84ª is then slipped under the machine with its flange against the forward side of the bed frame near the inner end thereof, and is secured in position by a jack 85. The guide plate 84 has an upturned end 84ᵇ the purpose of which will presently appear.

Figure 12:
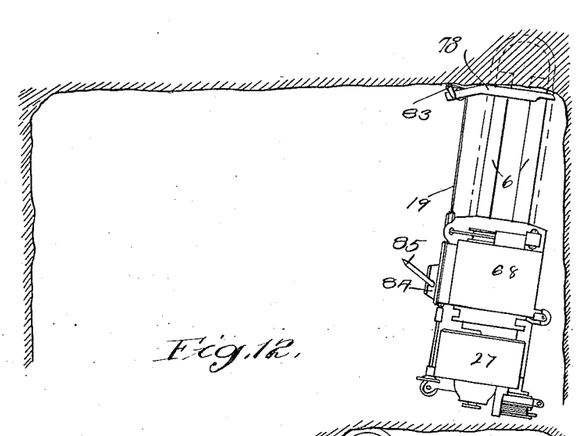
Fig. 12 is a similar view showing the machine when the sumping cut is partially completed.
Figure 13:
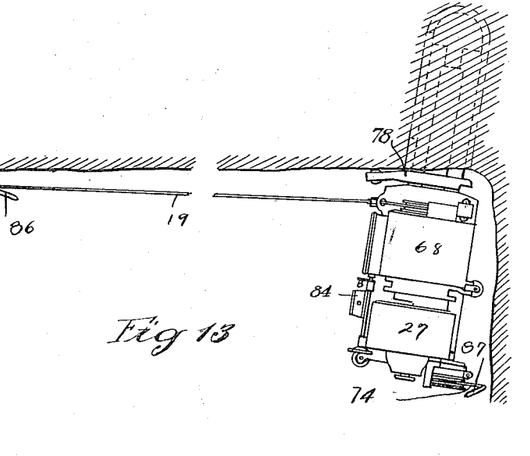
Fig. 13 is a similar view showing the machine at the end of the sumping cut and ready to start the side cut along the face of the coal.
Figure 14:
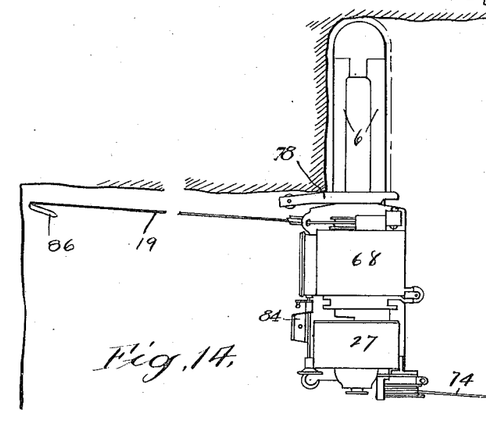
Fig. 14 is a similar view showing the machine during the operation of undercutting along the face of the coal.

The motor having been started, the collar clutch 58 is thrown in, and clutch 46 is thrown into engagement with the pinion 41, thus driving the cutters and turning the winding drum 18 at slow speed. The tension on the cable 19 draws the machine forward against the coal, forcing the cutter frame under the face as the cutters remove the coal. The combined action of the cable tension and reaction on the cutters as the entering cut begins, is to throw the inner end of the cutter frame to the right and the outer end of the machine to the left. This action is counteracted by the engagement of the guide arm 78 with the taut cable, and by the guide plate 84, the former preventing the movement of the cutter frame to the right, while the guide plate prevents the outer end of the machine from swinging to the left. During the first part of the sumping cut, the guide arm 78 moves inward with the cutter frame along the cable 19 until the cutter arm engages the face of the coal, as shown in Fig. 12. Thereafter the cutter frame slides inward in relation to the guide arm until the sumping cut is finished, with the machine in the position shown in Fig. 13, where, it will be noted, the inner end of the bed frame is forced up to the guide arm. When the machine has thus been advanced fully under the coal, the cable 19 is stretched along the face to the left rib where it is made fast to an anchor or jack 86. The rear guide cable 74 is then made fast to a jack 87 adjacent the right rib, and the machine is again started. At the beginning of the side cut, the outer winding drum 73 is locked fast by means of the brake, thus making the outer end of the machine practically a pivot point, while the cutter bar is swung forward by the winding up of the propelling cable 19. As soon as the machine is swung around to the proper angle for side cutting, the brake upon the outer drum is loosened up so as to allow it to pay out the cable 74 and maintain the machine at the proper angle to the face as the undercutting proceeds. As the machine moves along the face, the guide bar 78 engages the face of the coal and serves as a sort of buffer for the inner end of the bed frame. The guide bar or arm has a comparatively large and flat inner face extending to each side of the longitudinal center line of the machine so that it is well adapted to engage the face of the coal in the manner stated. It is often advantageous to retain the guide plate 84 under the machine during the running cut along the face, the upturned end 84$^b$ of the plate adapting it to act as a sort of runner or shoe for the machine. In Figs. 13 and 14 the guide plate is indicated as in such use, it having been moved inward toward the coal face somewhat at the end of the sumping cut so as to bring it to a suitable position under the machine. When the undercut is completed, the cable 74 is wound upon its drum, and the cable 19 is then taken to the rear and suitably anchored for the purpose of drawing the machine away from the face to the point where it is loaded upon the truck to be removed to another room. In thus moving the machine about in the room, the clutch 46 is thrown forward so as to drive the drum 18 at its higher speed.

Figure 15:
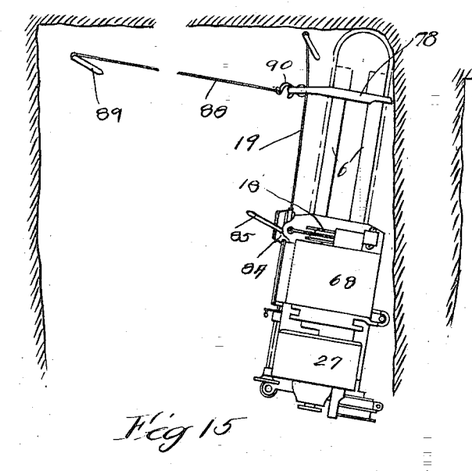
Figs. 15 and 16 are diagrammatic views showing the machine making the sumping cut with the assistance of auxiliary guiding devices not employed in Figs. 11 and 12.
Figure 16:
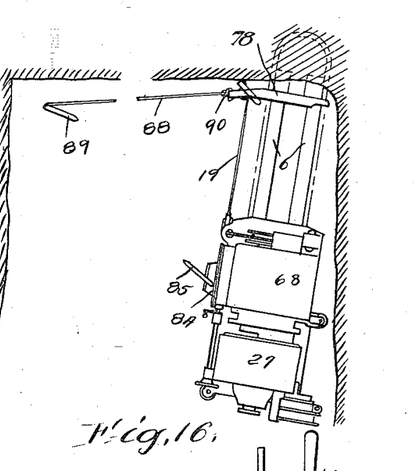
Figures 17, 18, 19, 20:
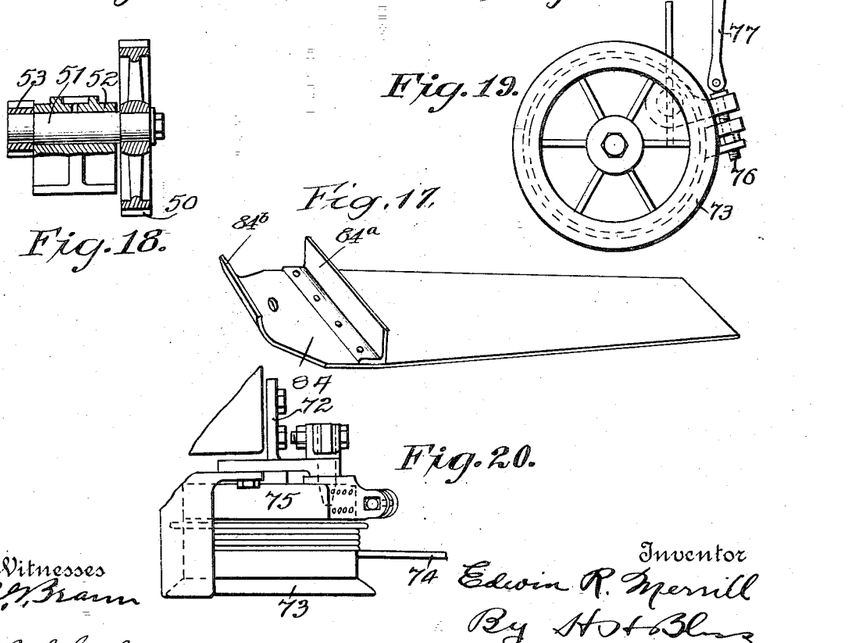
Fig. 17 is a perspective view of the flanged plate used to guide the machine during the sumping cut and as a shoe or runner during the side cutting.
Fig. 18 is a vertical section taken on the axis of the change-speed countershaft.
Fig. 19 is an end elevation of the drum for the check or retarding rope and adjacent parts.
Fig. 20 is a top plan view of the parts in Fig. 19.

In some instances it may be desirable to supplement the guiding action of the taut cable 19 during the first part of the sumping cut. In Figs. 15 and 16 I show a simple device which may be used for this purpose. A short length of cable 88 is secured to a jack 89 and is provided with a hook 90 which engages the end of the guide arm 78. With this arrangement the force tending to throw the inner end of the cutter frame to the right is resisted in large part by the cable 88, which swings after the manner of a tie from the jack 89 as the machine advances from the position shown in Fig. 15 to that shown in Fig. 16.

In operating low down under-cutting mining machines, whether of the "breast" type or of the "longwall" type, one of the serious impediments met with is the accumulation of "slack," the fine cuttings and pulverized material drawn out by the cutters in their rapid movement. If the kerf is five inches deep vertically and running six feet under the coal with an advancing speed of two feet per minute, it will be seen that there are several cubic feet of slack to be drawn out and disposed of per minute. By having the cutting apparatus, the motor, the cutter driving gear, and the propelling mechanism arranged in the way herein shown, the cutting apparatus is not only strongly braced throughout, but is so disposed as to deliver the slack at the outer end of the machine through a clear unobstructed passageway. The rear sprocket wheel is in such a position that as the chain comes outward its links and the cutters throw the slack or cuttings out, clear of the machine, where the "helper" can rapidly remove them with his shovel. One of the frequent causes of breakage with mining machines of this class is the rapid packing and choking of the slack among the parts of the mechanism. The present machine is built in such way as to bind together two horizontal floor-like parts having between them a chamber inclosed at top, bottom and sides wherein the only moving parts are the chain, the sprocket wheel, and the slack coal brought back by them. The motor it will be seen overhangs, outward, the outer end of the bed frame, the latter being shortened to transverse lines approximately near the chain sprocket wheel and the outer points of the cutter chain travel. This not only brings the cuttings and slack entirely out into "the open" but shortens up the heavy parts of the bed to such an extent that the machine is greatly lightened without reducing the strength of union of its parts. This arrangement of the motor is in contrast with, and superior to, that followed in other machines of this class where the motor is arranged at the inner end of the bed frame and all the gearing extends outward from it; in such machines the inner face of the motor limits the insertion of the cutting apparatus into the coal, and its outer face limits the forward positioning of the power transmitting devices, except as to those which are placed underneath it. These machines must be "low down" and but a small part of the gearing can be placed underneath. With a motor of given power and with a given cubical space for the arrangement of gearing and shafting, in a machine intended to produce a given length of cut under the coal, the bed and the parts connected therewith can be arranged much more advantageously when disposed in the way herein shown.

I am enabled to provide not only a substantially slack-tight chamber at the inner end of the bed, and below the gearing and shafting, but also a similar tight chamber or housing immediately above the outer moving parts of the chain by arranging the vertical shafting at the inner side of the motor, the drum at the inner end, and the power transmitting and driving devices in the way illustrated upon the top plate of the bed, and combining with all of these parts a housing having the element or section in the transverse planes of the vertical shaft and extending around it, also the section between that one and the motor, the section that extends inward from the vertical shaft to the transverse plane of the drum.

In order to keep the vertical dimensions of the machine as short as possible, I utilize for attaching the rheostat, the space between the bounding longitudinal vertical planes of the projecting parts of the housing on the left hand side of the machine. And the rheostat is operated at the outer end of the machine by means of the gear rod 70 and the hand-wheel 71 situated where one of the two machine operators at the outer end of the apparatus can immediately control it. There are but a few inches from the rheostat control to the machine controller at 76. The other operator by means of the lever 49 can, on whichever side of the machine he stands, throw the slow feed gear out and the fast gear into action, as he finds advisable.

The bed frame, the power transmitting devices and their mountings or supports on the frame, may be regarded as an entirety which is separable into two distinct parts. One part comprises the bottom wall or ground rest of the bed frame upon which is supported the large, heavy spur master wheel under the motor, the sprocket wheel and its stud shaft; while the other part comprises the upper element of the bed upon which are supported the feed apparatus and its power transmitting gearing; these two parts having separable intermeshing gear wheels, to-wit, the pinion 56 and the gear wheel 57. In this respect the machine differs from those in which the cutter driving gearing and the feed gearing and shafting are all supported from the top part of the bed or from the motor. In the latter case it is necessary to carry heavy supporting plates or brackets of metal around the large master gear which drives the cutter chain. In the present machine all of this metal is eliminated. The bottom plate is made strong and bolted firmly to the other elements of the bed.

What I claim is:—
1. In a mining machine, the combination of a bed frame, a chain cutting apparatus fixed bodily thereon and projecting both inward and outward from the inner end of the frame, a motor secured to the outer end of the frame above the outer end of the cutting apparatus, a winding drum at the inner end of the frame, a rope having its end fixed thereto for drawing the machine sidewise, gearing driven by the motor and situated at the inner side thereof, a single gear wheel rigidly connected to the drum, power transmitting devices between the said gear and the aforesaid motor driven gearing and situated between the motor and the drum and comprising change-speed devices, whereby with a constant speed of the motor the machine can be fed sidewise with varying speeds through the said single drum-gear, substantially as set forth.

2. In a mining machine, the combination of a bed frame having a shoe-like bottom plate adapted to slide universally over the ground surface or floor of a mine, an endless chain cutting apparatus bodily fixed rigidly in relation to the bed frame, said cutting apparatus projecting inward and outward from the inner end of the bed frame, a driving gearing for the cutting apparatus having a bearing support on the outer part of the said bottom plate, a feeding drum mounted on the inner end of the bed frame, and gearing at the inner side of the motor and interposed between it and the said drum and mounted independently of the said bottom plate, substantially as set forth.

3. In a mining machine, the combination of a bed frame having side walls or flanges, a top horizontal wall, a bottom wall or ground rest, a cutting apparatus extending inward and outward from the inner end of the bed frame and having the outward extending part disposed in the chamber between the two horizontal walls of the bed frame, a motor mounted on and overhanging the outer end of the bed frame, a feeding drum mounted on the inner end of the bed frame, transmission gearing interposed between the motor and the feeding drum and mounted on the upper horizontal wall of the bed frame at the inner side of the motor, and chain driving apparatus under the motor and at the outer end of the bed frame, said top and bottom walls of the bed frame forming a substantially inclosed chamber surrounding the outer part of the chain which extends to the outer end of the cutting apparatus, substantially as set forth.

4. In a mining machine, the combination with a bed frame having an upper horizontal section, a lower horizontal section or bottom plate, and means for rigidly fastening together the said two horizontal frame sections, of an endless chain cutting apparatus extending inward from the inner end of the bed frame and extending outward therefrom approximately to the outer end of the bed frame, an electric motor mounted on the upper part of the bed frame, cutter driving gearing having a bearing support on the bottom or floor of the frame, power transmitting devices extending from the motor to the chain driving gearing, a drum mounted on the bed frame, a flexible draft device actuated by the drum, and power transmitting devices between the motor and the said drum, substantially as set forth.

5. In a mining machine, the combination of a bed frame, an endless chain cutting apparatus disposed longitudinally of the bed frame and projecting from the inner end thereof, a winding drum mounted upon said frame to turn on a horizontal axis, a motor mounted upon the bed frame, driving connections between the motor and the cutting apparatus, and multiple speed power transmission devices between the motor and the winding drum comprising a transmission shaft, double reduction gearing between said transmission shaft and the drum, and clutch devices whereby the transmission shaft can be caused to drive a drum directly or through said double reduction gearing.

6. In a mining machine, the combination of a bed frame, an endless chain cutting apparatus disposed longitudinally of the bed frame and projecting from the inner end thereof, a winding drum mounted upon said frame, a motor mounted upon the frame, driving connections between the motor and the cutting apparatus, and multiple speed power transmission devices between the motor and the winding drum comprising a gear mounted to turn with the winding drum, a transmission shaft, a gear mounted to turn freely on said shaft, a secondary shaft parallel with the transmission shaft having two gears mounted thereon, one of said gears meshing with the gear on the transmission shaft, a pair of gears rigidly connected and mounted to turn freely on the transmission shaft, one of said gears meshing with one of the gears on the secondary shaft and the other meshing with the gear connected to the winding drum, and clutch devices for connecting either the single gear or the pair of gears on the transmission shaft to said shaft.

7. In a mining machine, the combination of a bed frame, a cutter frame projecting from the inner end of the bed frame, a cutter chain mounted on said cutter frame, a winding drum mounted on the bed frame, means for driving the winding drum, a cable on the winding drum adapted to have its free end extended inward along the cutter frame and made fast at a point adjacent the coal face for the purpose of forcing the cutters into the coal, and means mounted on the cutter frame movably engaging the said cable to prevent lateral movement of the cutter frame.

8. In a mining machine, the combination of a bed frame, a cutter frame projecting from the inner end of the bed frame, a cutter chain mounted on said cutter frame, a winding drum mounted on the bed frame, means for driving the winding drum, a cable on the winding drum adapted to have its free end extended inward along the cutter frame and made fast at a point adjacent the coal face for the purpose of forcing the cutters into the coal, means mounted on the cutter frame movably engaging the said cable to prevent lateral movement of the cutter frame, and a stationary guide to slidably engage the side of the bed frame and prevent lateral movement thereof.

9. In a mining machine, the combination of a bed frame, a cutter frame projecting from the inner end of the bed frame, a cutter chain mounted on said cutter frame, a winding drum mounted on the bed frame, means for driving the winding drum, a cable on the winding drum adapted to have its free end extended inward along the cutter frame and made fast at a point adjacent the coal face for the purpose of forcing the cutters into the coal, and means slidably mounted on the cutter frame movably engaging the cable to prevent lateral movement of the cutter frame.

10. In a mining machine, the combination of a bed frame, a cutter frame projecting from the inner end of the bed frame, a cutter chain mounted on said cutter frame, a winding drum mounted on the bed frame, means for driving the winding drum, a cable on the winding drum adapted to have its free end extended inward along the cutter frame and made fast at a point adjacent the coal face for the purpose of forcing the cutters into the coal, and means permanently mounted on the cutter frame movably engaging the cable to prevent lateral movement of the cutter frame.

11. In a mining machine, the combination of a bed frame, a cutter frame projecting from the inner end thereof, a cutter chain movably mounted on said cutter frame, means for bodily propelling the machine endwise to force the cutters into the coal, and means for guiding the machine against lateral movement comprising a swinging tie having one end anchored at a point to one side of the cutter frame and its other end connected to said cutter frame.

12. In a mining machine, the combination of a bed frame, a cutter frame projecting from the inner end of the bed frame, a cutter chain mounted on said cutter frame, a winding drum mounted on the bed frame, means for driving the winding drum, a cable on the winding drum adapted to have its free end extended inward along the cutter frame and made fast at a point adjacent the coal face for the purpose of forcing the cutters into the coal, guide means slidably mounted on the cutter frame movably engaging the cable, and a tie having one end anchored at a point to one side of the cutter frame and its other end connected to the said guide means.

13. In a mining machine adapted to have its cutting apparatus first thrust endwise into the coal and thereafter drawn laterally while cutting, the combination of a bed frame, an endless chain cutting apparatus bodily fixed in permanent relations to the bed frame and having its active part projecting inward therefrom, a winding drum on the bed frame, a cable and cable guides adapted to have the cable exert draft tension on the machine when it is being thrust forward longitudinally into the coal and also to exert tension thereon when it is moving laterally along the face of the coal, a guiding device engaging with the cutting apparatus and adapted to remain stationary while said apparatus moves longitudinally forward, and means for connecting the said guiding device with the said cable when the latter is arranged approximately parallel to the path of the cutting apparatus.

14. In a mining machine adapted to have its cutting apparatus first thrust endwise into the coal and thereafter drawn laterally while cutting, the combination of a bed frame, an endless chain cutting apparatus bodily fixed in permanent relations to the bed frame and having its active part projecting inward therefrom, a winding drum on the bed frame, a cable and cable guides adapted to have the cable exert draft tension on the machine when it is being thrust forward longitudinally into the coal and also to exert tension thereon when it is moving laterally along the face of the coal, a guiding device engaging with the cutting apparatus and adapted to bear against the face of the coal at points on both sides of the central longitudinal line of said apparatus, and also adapted to be slidably connected with the said cable when the latter is arranged on lines substantially parallel to the longitudinal lines of the cutting apparatus.

15. In a mining machine of the class described, the combination of the bed frame, chain cutting apparatus fixed bodily rigidly to the bed frame and projecting forward therefrom, power devices on the bed frame, the winding mechanism at the inner end of the bed frame, power transmitting devices connecting the power devices with the winding mechanism, a cable secured to the winding mechanism and adapted to have its end made stationary relative to the entire machine at points adjacent to the cutting apparatus when the latter is being advanced longitudinally into the coal and adapted to draw the machine laterally across the face of the coal, a guiding device engaging transversely with the cutting apparatus and adapted to be connected to the said cable when the latter is arranged approximately parallel to the longitudinal lines of the cutting apparatus, said guiding device extending across the central longitudinal vertical plane of the cutting apparatus and adapted to engage with the face of the coal on both sides of the said plane, substantially as set forth.

16. In a mining apparatus of the class described, the combination of a bed frame having a bottom part adapted to rest on and slide longitudinally and laterally over the mine floor, cutting apparatus projecting inward from the inner end of the bed frame and adapted to be thrust longitudinally into the coal and also to be carried laterally while cutting, and a detachable combined guide and runner plate adapted to be slipped under the bed frame, said plate having a vertical projection adapted to engage the bed frame and guide the machine in its longitudinal movement and having an upturned edge and being adapted to move with the bed frame as a shoe-like runner when said frame is moved laterally.

17. In a mining apparatus, the combination of a bed frame having a bottom part adapted to rest on and slide over the mine floor, cutting apparatus projecting from the bed frame and adapted to be carried laterally while cutting, and a detachable runner plate adapted to be slipped under the bed frame, said plate having an upturned edge, and being adapted to move with the bed frame as a shoe-like runner when said frame is moved laterally.

18. In a mining apparatus of the class described, the combination of a bed frame, a cutter frame projecting from the inner end thereof, a cutter chain movably mounted on said cutter frame, means for bodily propelling the machine endwise to force the cutters into the coal, and means for guiding the machine in its endwise movement comprising a swinging tie having one end part anchored at a point to one side of the machine and its other end part engaging with the machine at a point to resist rearward, lateral swinging of the inner part of the machine as the cutters enter the coal.

19. In a mining machine, the combination of a bed frame, a cutter frame projecting from the inner end of the bed frame, a winding drum mounted on the bed frame, means for driving the winding drum, a cable on the winding drum adapted to have its free end extended inward along the cutter frame and made fast at a point adjacent the coal face for the purpose of forcing the cutters into the coal, and means engaging the cable and having slidable engagement with the cutter frame for opposing lateral movement of the cutter frame as it advances into the coal.

20. In a mining machine, the combination of a bed frame, a cutter frame projecting from the inner end of the bed frame, a cutter chain mounted on said cutter frame, a winding drum mounted on the bed frame, means for driving the winding drum, a cable on the winding drum adapted to have its free end extended inward along the cutter frame and made fast at a point adjacent the coal face for the purpose of forcing the cutters into the coal, means forming a permanent part of the machine slidably mounted on the cutter frame and adapted to engage the cable to oppose lateral movement of the cutter frame as it advances into the coal, and a stationary guide to slidably engage the side of the bed frame and prevent lateral movement thereof.

In testimony whereof I affix my signature, in presence of two witnesses.

EDWIN R. MERRILL.

Witnesses:
E. L. HOPKINS,
CHARLES J. KIENZLE.